United States Patent
Cina et al.

(10) Patent No.: US 11,698,100 B2
(45) Date of Patent: Jul. 11, 2023

(54) MOTOR VEHICLE DRIVE SHAFT AND METHOD FOR PRODUCING IT

(71) Applicant: Bayerische Motoren Werke Aktiengesellschaft, Munich (DE)

(72) Inventors: Marek Cina, Munich (DE); Anton Mangold, Hohenthann (DE); Wolfgang Streinz, Landshut (DE); Torsten Wingeleit, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 364 days.

(21) Appl. No.: 16/756,620

(22) PCT Filed: Dec. 10, 2018

(86) PCT No.: PCT/EP2018/084249
§ 371 (c)(1),
(2) Date: Apr. 16, 2020

(87) PCT Pub. No.: WO2019/121124
PCT Pub. Date: Jun. 27, 2019

(65) Prior Publication Data
US 2020/0317047 A1    Oct. 8, 2020

(30) Foreign Application Priority Data
Dec. 19, 2017    (DE) .................. 10 2017 223 304.4

(51) Int. Cl.
*F16C 3/02*    (2006.01)
*F16D 1/072*    (2006.01)
*F16D 1/10*    (2006.01)

(52) U.S. Cl.
CPC .......... *F16C 3/023* (2013.01); *F16C 2226/36* (2013.01); *F16C 2326/06* (2013.01); *F16D 1/072* (2013.01); *F16D 2001/103* (2013.01)

(58) Field of Classification Search
CPC .. F16C 3/02; F16C 3/023; F16C 3/026; F16C 2226/10; F16C 2226/12; F16C 2226/36;
(Continued)

(56) References Cited

U.S. PATENT DOCUMENTS 4,211,589 A    7/1980   Fisher et al.
4,238,539 A  * 12/1980  Yates ..................... F16C 3/026
                                                              464/181
(Continued)

FOREIGN PATENT DOCUMENTS

CN         204061606 U  * 12/2014 ............. F16D 1/027
CN         105308335 A     2/2016
(Continued)

OTHER PUBLICATIONS

International Search Report (PCT/ISA/210) issued in PCT Application No. PCT/EP2018/084249 dated Mar. 18, 2019 with English translation (six (6) pages).
(Continued)

*Primary Examiner* — Josh Skroupa
(74) *Attorney, Agent, or Firm* — Crowell & Moring LLP

(57) ABSTRACT

A motor vehicle drive shaft has a receptacle tube component with a receptacle internal diameter and a push-fit component with a push-fit external diameter. The push-fit external diameter is smaller than or equal to the receptacle internal diameter. The receptacle tube component and the push-fit component can be rotated about a common drive shaft rotational axis and extend along the latter in a longitudinal direction. The receptacle tube component and the push-fit component are connected to one another for the transmission of torque. A connecting component is provided, wherein the connecting component is connected in a torque-conducting manner to the receptacle tube component by way of a receptacle connection. The connecting component is con-
(Continued)

nected to the push-fit component by way of a push-fit connection. At least one of the two connections is configured as a combined frictionally locking and positively locking shaft/hub connection.

10 Claims, 2 Drawing Sheets

(58) Field of Classification Search
CPC .. F16C 2226/38; F16C 2326/06; F16C 3/206; F16D 1/027; F16D 1/064; F16D 1/068; F16D 1/072; F16D 1/0829; F16D 1/02; F16D 1/08; F16D 2001/103; F16B 17/004; F16B 4/004; F16B 11/002; Y10T 403/4966
USPC .................................................. 464/162, 182
See application file for complete search history.

(56) References Cited

U.S. PATENT DOCUMENTS

| | | | | | |
|---|---|---|---|---|---|
| 4,358,284 | A | * | 11/1982 | Federmann | F16D 1/068 464/181 |
| 4,421,497 | A | * | 12/1983 | Federmann | F16D 1/027 464/181 |
| 4,451,245 | A | * | 5/1984 | Hornig | F16C 3/026 464/181 |
| 4,715,739 | A | | 12/1987 | Rueegg et al. | |
| 5,230,661 | A | * | 7/1993 | Schreiber | F16C 3/026 464/182 |
| 5,304,012 | A | * | 4/1994 | Wendling | B21K 25/00 403/359.6 |
| 5,601,494 | A | * | 2/1997 | Duggan | F16C 3/026 464/182 |
| 5,632,685 | A | * | 5/1997 | Myers | F16D 1/068 464/183 |
| 6,666,772 | B1 | * | 12/2003 | Cheney | B60B 35/127 464/183 |
| 6,692,365 | B2 | * | 2/2004 | Suzuki | F16C 3/026 464/162 |
| 6,773,354 | B2 | * | 8/2004 | Marriott | F16C 3/023 464/180 |
| 7,438,612 | B2 | * | 10/2008 | Wada | F16C 3/026 464/180 |
| 7,485,045 | B2 | * | 2/2009 | Williams | F16C 3/026 464/182 |
| 7,874,925 | B2 | * | 1/2011 | Dewhirst | F16D 1/072 464/182 |
| 8,876,614 | B2 | * | 11/2014 | Nakamura | F16D 1/087 464/181 |
| 9,518,601 | B2 | * | 12/2016 | Shippy | F16C 3/02 |
| 10,138,925 | B2 | * | 11/2018 | Nakamura | F16C 3/023 |
| 10,415,645 | B2 | * | 9/2019 | Katayama | F16D 1/116 |
| 10,598,210 | B2 | * | 3/2020 | Cheng | F16C 3/023 |
| 11,384,787 | B2 | * | 7/2022 | Dorman | F16D 1/068 |
| 2002/0195291 | A1 | * | 12/2002 | Nonogaki | F16C 3/026 180/337 |
| 2005/0075174 | A1 | | 4/2005 | Fraher | |
| 2010/0038167 | A1 | * | 2/2010 | Bilmayer | F16H 55/26 280/93.514 |
| 2012/0157217 | A1 | | 6/2012 | Nakamura et al. | |
| 2015/0119154 | A1 | * | 4/2015 | Choi | F16F 7/108 464/180 |
| 2015/0226269 | A1 | * | 8/2015 | Katsuragi | B23K 11/34 464/106 |
| 2016/0084317 | A1 | * | 3/2016 | Akita | B60K 17/22 464/162 |
| 2016/0123376 | A1 | | 5/2016 | Buschbeck | |
| 2016/0238083 | A1 | * | 8/2016 | Piorkowski | F16D 3/10 |
| 2016/0273575 | A1 | | 9/2016 | Morlock et al. | |
| 2016/0281767 | A1 | * | 9/2016 | Mori | F16C 3/023 |
| 2017/0227045 | A1 | * | 8/2017 | Katayama | B29C 65/48 |
| 2017/0227059 | A1 | * | 8/2017 | Kamikawa | F16C 3/023 |
| 2018/0003244 | A1 | | 1/2018 | Schneider et al. | |
| 2019/0185048 | A1 | * | 6/2019 | Carlini | F16C 3/023 |
| 2022/0402016 | A1 | * | 12/2022 | Herr | F16D 1/027 |

FOREIGN PATENT DOCUMENTS

| | | | |
|---|---|---|---|
| CN | 107044477 A | 8/2017 | |
| CN | 107208700 A | 9/2017 | |
| DE | 29 46 530 A1 | 5/1981 | |
| DE | 3906116 C1 * | 6/1990 | ............ F16C 3/023 |
| DE | 4313296 A1 * | 6/1994 | ............ F16D 1/072 |
| DE | 4327908 C1 * | 12/1994 | ............ B60K 17/22 |
| DE | 19654552 A1 * | 7/1997 | ............ F16C 3/026 |
| DE | 102008005359 A1 * | 6/2009 | ............ F16B 4/004 |
| DE | 10 2011 000 992 A1 | 9/2012 | |
| DE | 102013103769 B3 * | 10/2014 | ............ F16C 3/026 |
| DE | 10 2015 209 110 A1 | 11/2016 | |
| EP | 1760346 A2 * | 3/2007 | ............ F16D 1/027 |
| EP | 3 070 348 A1 | 9/2016 | |
| GB | 1306938 A * | 2/1973 | ............ F16C 3/026 |
| JP | 04140514 A * | 5/1992 | ............ F16C 3/026 |
| JP | 2005-280604 A | 10/2005 | |
| WO | WO-2005113990 A1 * | 12/2005 | ............ F16D 1/068 |
| WO | WO-2008025177 A1 * | 3/2008 | ............ F16C 3/026 |
| WO | WO-2016121772 A1 * | 8/2016 | ............ F16C 3/026 |

OTHER PUBLICATIONS

German-language Written Opinion (PCT/ISA/237) issued in PCT Application No. PCT/EP2018/084249 dated Mar. 18, 2019 (six (6) pages).

German-language Office Action issued in German Application No. 10 2017 223 304.4 dated Nov. 16, 2018 (six (6) pages).

Chinese-language Office Action issued in Chinese Application No. 201880070665.6 dated Oct. 22, 2021 with English translation (17 pages).

Chinese-language Office Action issued in Chinese Application No. 201880070665.6 dated May 20, 2022 with English translation (19 pages).

* cited by examiner

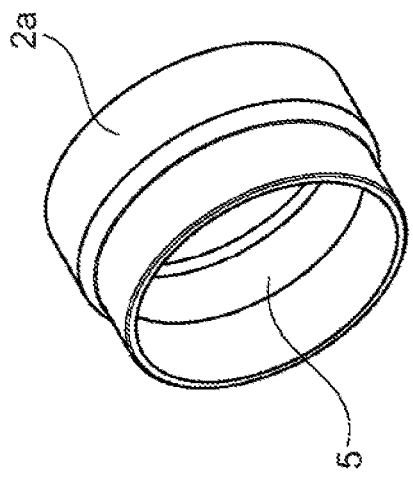
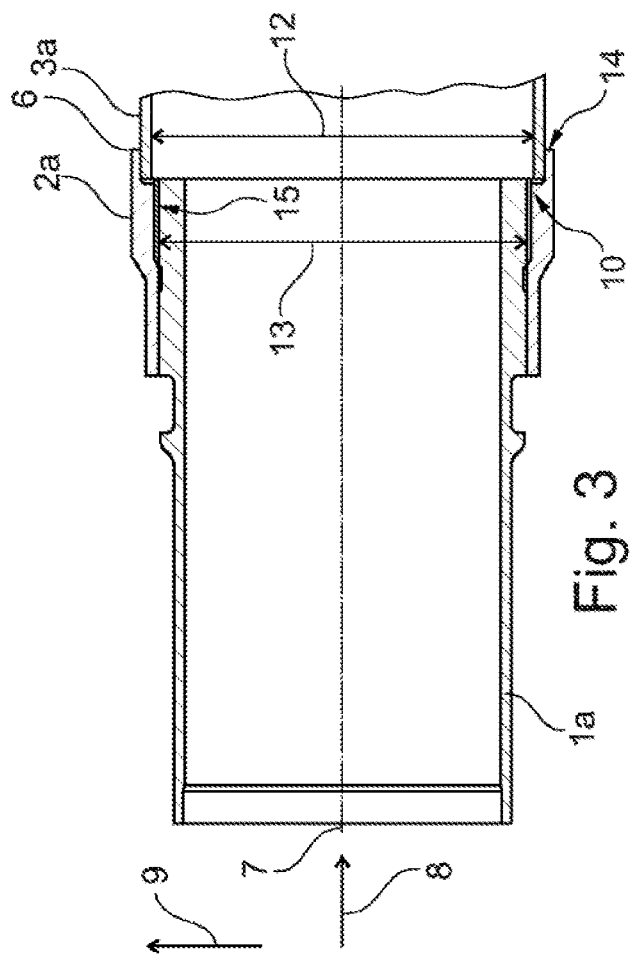
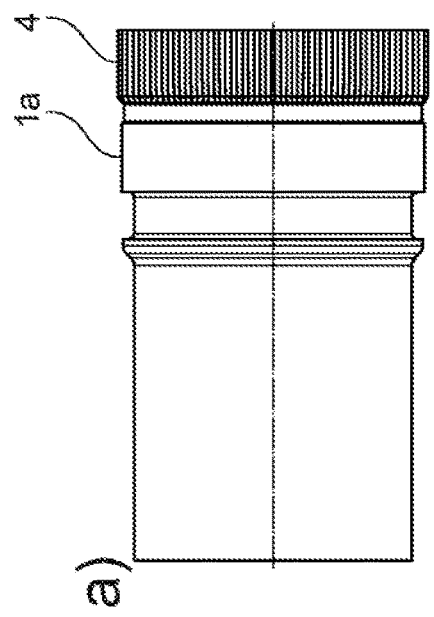
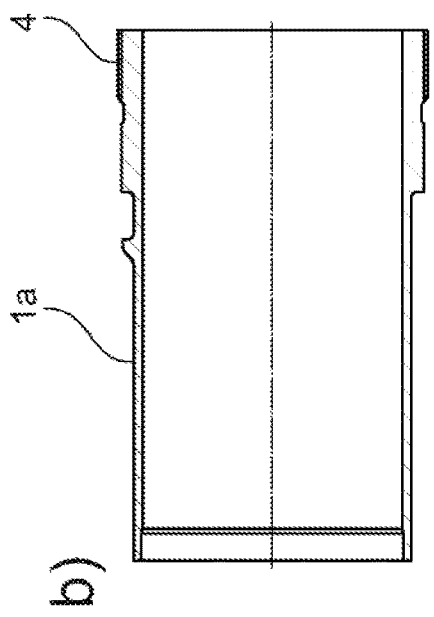

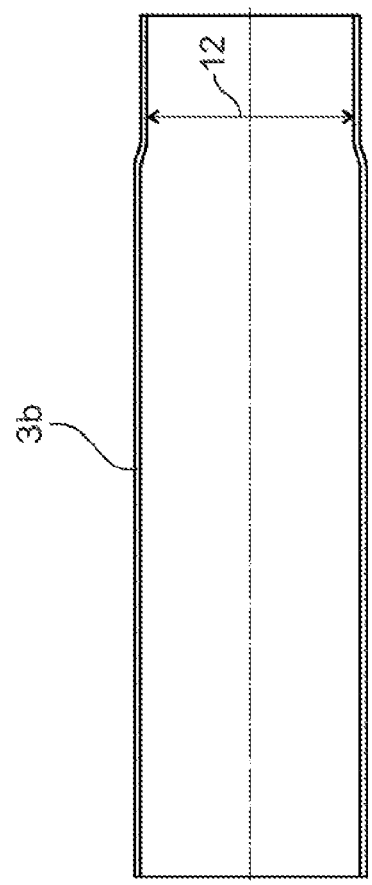
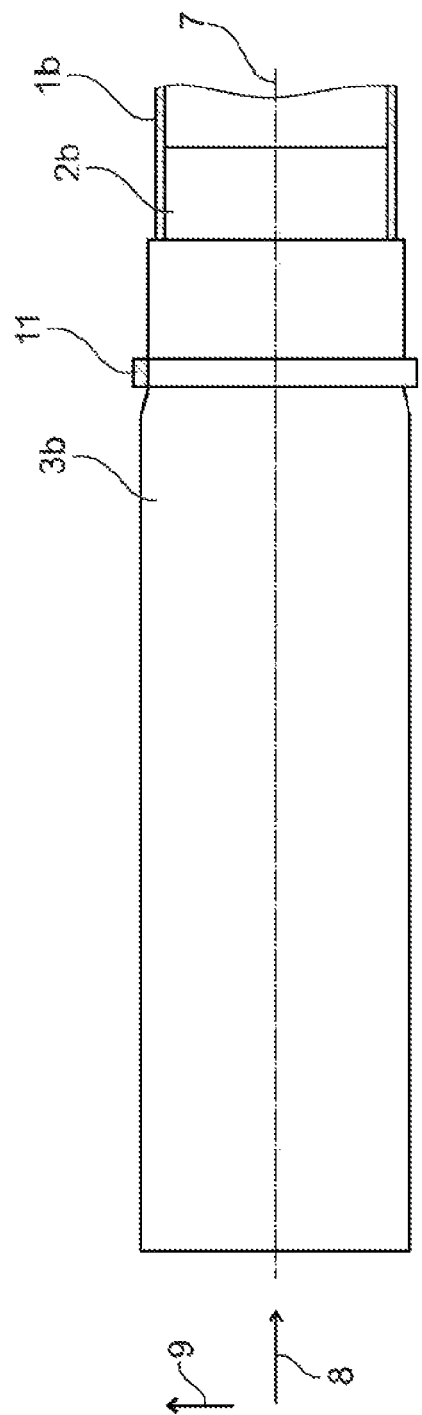
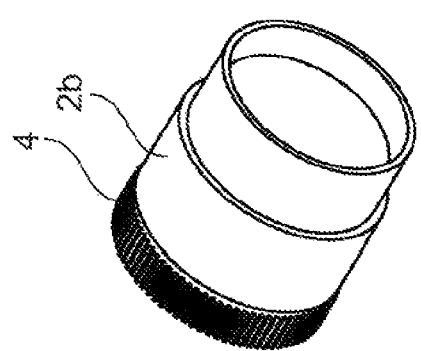

MOTOR VEHICLE DRIVE SHAFT AND METHOD FOR PRODUCING IT

BACKGROUND AND SUMMARY OF THE INVENTION

The invention relates to a motor vehicle drive shaft and to a method for producing the same.

Motor vehicle drive shafts are known from EP 3 070 348 A1 and from DE 10 2015 209 110 A1. A motor vehicle drive shaft has a receptacle-tube component having a receptacle internal diameter and a push-fit component having a push-fit external diameter, wherein the push-fit external diameter is smaller than or equal to the receptacle internal diameter, wherein the receptacle-tube component and the push-fit component are rotatable about a common drive shaft rotation axis and extend along the common drive shaft rotation axis in a longitudinal direction, and wherein the receptacle-tube component and the push-fit component for transmitting torque are connected to one another.

The invention is described hereunder by means of a motor vehicle drive shaft having a defined failure behavior in the event of a crash, but this is not to be understood as a limitation of the invention.

A motor vehicle drive shaft is adapted for transmitting high drive forces from a vehicle gearbox that can be shifted to an axle gearbox. In the event of an accident of the motor vehicle (event of a crash) the motor vehicle drive shaft is intended to fail in a defined manner beyond a specific loading in the longitudinal direction, the motor vehicle driveshaft being in particular intended not to excessively reinforce the motor vehicle in the longitudinal direction.

It is an object of the invention to provide a motor vehicle drive shaft with an improved operating behavior as well as to provide a production method for the motor vehicle drive shaft. This object is achieved by a motor vehicle drive shaft, as well as by a motor vehicle drive shaft produced according to a production method, according to the claimed invention.

In the context of the invention, a motor vehicle drive shaft is to be understood to be a shaft for transmitting drive output in the motor vehicle. The motor vehicle drive shaft is preferably adapted for transmitting from a vehicle gearbox to an axle gearbox. The vehicle gearbox is in particular configured as a multi-speed gearbox which can be shifted, or shifts automatically, respectively. The axle gearbox has in particular a differential gearbox and is adapted for distributing a drive output from the motor vehicle drive shaft to a motor vehicle axle. The motor vehicle drive shaft in the intended operation transmits this drive output in the form of a rotating speed and torque and is accordingly rotatable about a drive shaft rotation axis. The motor vehicle drive shaft in the direction of this drive shaft rotation axis (longitudinal direction) has a longitudinal extent, and in a manner orthogonal to the latter (radial direction) has a radial extent. This motor vehicle drive shaft has a receptacle-tube component, a push-fit component, as well as a connection component and is at least in portions configured as a hollow-shaft component.

In the context of the invention, a receptacle-tube component is to be understood to be a part of the motor vehicle drive shaft which in the event of an accident, or of a predefined loading in the longitudinal direction, respectively, is adapted such that the push-fit component is at least partially able to be push-fitted into this receptacle-tube component. The connection component is furthermore adapted for connecting in a torque-conducting manner the receptacle-tube component and the push-fit component to one another. In terms of the transmission of torque the connection component is thus disposed between the push-fit component and the receptacle-tube component.

The motor vehicle drive shaft furthermore has at least two states of which one is a torque-transmitting state in which the connection component conjointly with the receptacle-tube component configures a receptacle connection for the transmission of torque, and conjointly with the push-fit component configures a push-fit connection. A torque can thus be transmitted from the push-fit component by way of the connection component to the receptacle-tube component in the torque-transmitting state. Furthermore, the motor vehicle drive shaft can be converted to a crash state, this conversion being in particular irreversible. In this crash state, at least one of the previously mentioned connections (push-fit connection, receptacle connection), is destroyed in particular on account of a loading of the motor vehicle drive shaft in the longitudinal direction, and the push-fit component in the longitudinal direction is at least partially pushed into the receptacle-tube component.

Figuratively speaking, the motor vehicle drive shaft is designed in such a manner that in the event of a crash, or of a predefined loading in the longitudinal direction, respectively, at least one of these two connections (receptacle connection, push-fit connection), preferably a friction-fitting/form-fitting shaft-to-hub connection, fails and push-fitting the push-fit component into the receptacle-tube component in a telescopic manner is enabled. The motor vehicle drive shaft, on account of this push-fitting, is converted from the torque-transmitting state to the crash state thereof. The receptacle-tube component is preferably at least in portions or completely configured as a hollow shaft, in particular so as to be able to receive the push-fit component in the previously described event (crash state).

In particular so as to enable such a crash state, the receptacle-tube component has a receptacle internal diameter, and the push-fit component has a push-fit external diameter, wherein the receptacle internal diameter is larger than or equal to the push-fit external diameter. The receptacle internal diameter is preferably larger than or equal to the corresponding push-fit external diameter at least in a region which is at adapted such that the push-fit component in the crash state is displaced into the receptacle-tube component.

Furthermore provided is a friction-fitting/form-fitting shaft-to-hub connection so as to configure the receptacle connection, or the push-fit connection, or both connections. Connections of this type are known from the prior art. In general, a friction-fitting/form-fitting shaft-to-hub connection can be formed in such a manner that only the shaft component or only the hub component has a form-fitting region for configuring a form-fitting connection. This component having the form-fitting region is then incorporated, preferably press-fitted, in the respective other component such that the form-fitting region mentioned is replicated in the respective other component, thus configures in particular a further form-fitting region in this other component, and the two components (shaft, hub) are held together in the form-fitting and friction-fitting manner. In terms of the installation space required, a high torque bearing capability is enabled by way of such a so-called friction-fitting/form-fitting shaft-to-hub connection, in particular in comparison to a conventional friction-fitting or form-fitting shaft-to-hub connections, and furthermore, in comparison to a materially integral connection, a relatively simple displacement of the component that is connected to the friction-fitting/form-fitting shaft-to-hub connection is enabled in the longitudinal direction of the motor vehicle drive shaft, while this connection is cancelled.

In one preferred embodiment of the invention, the friction-fitting/form-fitting shaft-to-hub connection is configured as a so-called knurled press-fit connection, or knurling press-fit connection, respectively. The form-fitting region of a knurling press-fit connection is preferably generated by means of a so-called knurling method, thus in particular by means of a non-clamping forming procedure. A solidification and hardening of the surface region, in particular strain hardening, arises in particular by means of said forming procedure in the form-fitting region. In order for the knurling press-fit connection to be configured, the component having the form-fitting region is incorporated in another component, preferably press-fitted and particularly preferably press-fitted in the longitudinal direction. A further form-fitting region is herein created in the component into which the component having the form-fitting region is press-fitted, said further form-fitting region conjointly with the form-fitting region configuring the friction-fitting/form-fitting shaft-to-hub connection. The further form-fitting region is thus generated in particular in a tool-less manner when press-fitting the component having the form-fitting region.

In one preferred embodiment the connection component, in particular radially on the outside, has a knurling. The knurling is preferably produced by a non-subtractive forming procedure, preferably by cold-forming using a so-called knurling tool. Furthermore preferably, the connection component in the region of the knurling, in particular on account of the forming of the latter, has a specific hardness on the component surface, a so-called connection receptacle hardness. In such a design embodiment, the knurling can be understood to be a form-fitting region. The receptacle-tube component has a receptacle connection region for configuring the friction-fitting/form-fitting shaft-to-hub connection. This receptacle connection region can in particular be understood to be the further form-fitting region, once the connection component is incorporated in the receptacle-tube component.

The receptacle-tube component in this receptacle connection region on the component surface has a specific hardness, a so-called receptacle hardness, in particular prior to the connection component being incorporated. The connection receptacle hardness herein is preferably greater than the receptacle hardness. On account of a design embodiment of the components in this manner it is in particular possible that the further form-fitting region in the receptacle-tube component is configured only when joining the connection component to the receptacle-tube component, and a particularly high torque is able to be transmitted by the motor vehicle drive shaft, and a favorable crash behavior is furthermore achievable.

In one preferred embodiment of the invention, a support ring is provided so as to be radially outside on the receptacle-tube component. This support ring is disposed in particular in the longitudinal direction in such a manner that this support ring at least partially or preferably completely covers the friction-fitting/form-fitting shaft-to-hub connection. The support ring in relation to the receptacle-tube component preferably has an interference fit or preferably a transition fit. It can be prevented or at least mitigated in particular by a support ring of this type that the receptacle-tube component flares when press-fitting the connection component so as to configure the further form-fitting region.

A particularly reliable friction-fitting/form-fitting shaft-to-hub connection can be achieved in particular on account of the use of a support ring.

In one preferred embodiment of the invention, the receptacle-tube component in the receptacle connection region has a receptacle external diameter. This receptacle external diameter is preferably smaller than the receptacle internal diameter. A particularly favorable crash behavior of the motor vehicle drive shaft can be achieved in particular on account of a diameter step of this type between the receptacle internal diameter and the receptacle external diameter.

In one preferred embodiment, the push-fit component, in particular so as to be radially outside, has a knurling. The knurling is preferably produced by a non-subtractive forming procedure, preferably by cold-forming using a so-called knurling tool. Furthermore preferably, the push-fit component in the region of the knurling, in particular on account of the forming of this knurling, has a specific hardness on the component surface, a so-called push-fit hardness. In such a design embodiment the knurling can be understood to be a form-fitting region. The connection component has a connection region so as to configure the friction-fitting/form-fitting shaft-to-hub connection. This connection region can in particular be understood to be a further form-fitting region, in particular once the push-fit component is incorporated. The connection component in this connection region on the component surface has a specific hardness, a so-called connection push-fit hardness, in particular prior to the push-fit component being incorporated.

The push-fit hardness herein is preferably greater than the connection push-fit hardness. On account of a design embodiment of the components in this manner it is in particular possible that the further form-fitting region in the connection component is configured only when joining the connection component to the push-fit component. A particularly high torque is able to be transmitted by the motor vehicle drive shaft, and a favorable crash behavior is furthermore achievable, in particular on account of such a design embodiment of the invention.

In one preferred embodiment of the invention, one of the two connections (push-fit connection, receptacle connection) is configured as a materially integral connection. In particular, that connection of the two connections that is not configured as a friction-fitting/form-fitting shaft-to-hub connection is configured as a materially integral connection. The materially integral connection is preferably configured as a welded connection, and furthermore preferably the connection component and the push-fit component or the receptacle-tube component are configured so as to be integral to one another in order for the materially integral connection to be configured. A particularly good torque transmission capability can be achieved in particular on account of a materially integral connection of the two components.

Furthermore provided is a method for producing a motor vehicle drive shaft of the type described above. This method comprises the following steps:

providing a push-fit component, a receptacle-tube component, and a connection component;

providing at least one of these components with a knurling so as to configure the friction fitting/form-fitting shaft-to-hub connection;

press-fitting the component provided with the knurling into one of the other two components so as to configure a friction-fitting/form-fitting shaft-to-hub connection;

connecting the remaining component to the two components connected by means of the friction-fitting/form-fitting shaft-to-hub connection, with a, preferably materially integral, connection.

In one preferred embodiment of the method, the knurling is applied to the push-fit component. This knurling is preferably applied radially on the outside and is provided for configuring the friction-fitting/form-fitting shaft-to-hub connection to the connection component. The friction-fitting/form-fitting shaft-to-hub connection between the push-fit component and the connection component is in particular established only when press-fitting the connection component into the push-fit component, or is established only on account of the latter, respectively. The receptacle-tube component is furthermore preferably connected in a materially integral manner to the connection component. A motor vehicle drive shaft by way of which a high torque can be transmitted is producible in particular by way of such a design embodiment of the invention.

In one preferred embodiment of the method, the knurling is applied to the connection component. This knurling is preferably applied radially on the outside and is provided for configuring the friction-fitting/form-fitting shaft-to-hub connection to the receptacle-tube component. The friction-fitting/form-fitting shaft-to-hub connection between the connection component and the receptacle-tube component is in particular established only when press-fitting the connection component into the receptacle-tube component, or is established only on account of the latter, respectively. The push-fit component is furthermore preferably connected in a materially integral manner to the connection component. A motor vehicle drive shaft by way of which a high torque can be transmitted is producible in particular by way of such a design embodiment of the invention.

In one preferred embodiment of the method, a support ring is applied to the receptacle-tube component prior to the connection component being press-fitted into the receptacle-tube component. This support ring is preferably applied to the receptacle-tube component radially on the outside and in the longitudinal direction at least in portions or preferably completely covers the friction-fitting/form-fitting shaft-to-hub connection. By means of a support ring of this type it is possible for the receptacle-tube component to be reinforced in particular in the radial direction and to thus configure a particularly load-capable friction-fitting/form-fitting shaft-to-hub connection.

Individual embodiments and features of the invention are explained hereunder by means of the figures.

BRIEF DESCRIPTION OF THE DRAWINGS

FIG. 1a shows a first variant of the push-fit component in a frontal view.

FIG. 1b shows the first variant of the push-fit component in a sectional view.

FIG. 2 shows a perspective view of a first variant of the connection component.

FIG. 3 shows a longitudinal view of a first variant of the motor vehicle drive shaft.

FIG. 4 shows a perspective view of a second variant of the connection component.

FIG. 5 shows a sectional view of a second variant of the push-fit tube component.

FIG. 6 shows a partial sectional view of a second variant of the motor vehicle drive shaft.

DETAILED DESCRIPTION OF THE DRAWINGS

A first variant of the push-fit component 1a is illustrated in a frontal view in FIG. 1a. A knurling 4 which is provided for configuring a friction-fitting/form-fitting shaft-to-hub connection is applied to the push-fit component 1a. The same variant of the push-fit component 1a is shown in a longitudinal sectional illustration in FIG. 1b; it can be seen that the knurling 4 is applied to the push-fit component 1a.

A first variant of the connection component 2a is illustrated in a perspective manner in FIG. 2. The connection component 2a is adapted so as to be press-fitted onto the push-fit component 1a and conjointly with the latter configure the friction-fitting/form-fitting shaft-to-hub connection. On account of this press-fitting, the knurling 4 which represents the form-fitting region is replicated in the cylindrical face 5 of the connection component 2a, the cylindrical face 5 herein forming the further form-fitting region. Prior to the press-fitting of the push-fit component 1a having the knurling 4 into the connection component 2a, the cylindrical face 5 has a smooth surface; the friction-fitting/form-fitting shaft-to-hub connection is thus created only on account of the press-fitting of the connection component 2a.

A longitudinal sectional illustration of a first variant of the motor vehicle drive shaft having the connection component 2a, the push-fit component 1a, and the receptacle-tube component 3a, each belonging to this variant, is illustrated in FIG. 3. The receptacle-tube component 3a by means of the welded connection 6 is connected in a materially integral manner to the connection component 2a. The illustration in FIG. 3 shows the motor vehicle drive shaft in the torque-transmitting state thereof. The friction-fitting/form-fitting shaft-to-hub connection is cancelled under axial loading in the longitudinal direction 8 in the event of a crash, and the push-fit component 1a slides through the connection component 2a into the receptacle-tube component 3a (crash state). The motor vehicle drive shaft in the torque-transmitting state is mounted so as to be rotatable about the rotation axis 7. The motor vehicle drive shaft extends in the radial direction 9, so as to be orthogonal to the rotation axis 7. It can furthermore be seen that the push-fit connection 15 is configured as a friction-fitting/form-fitting shaft-to-hub connection 10 which is irreversibly cancelled when the motor vehicle drive shaft converts from the torque-transmitting state to the crash state in that the push-fit component 1a by way of the push-fit external diameter 13 is displaced into the receptacle-tube component 3a having the receptacle internal diameter 12. The receptacle connection 14 configured as the welded connection 6 is present between the receptacle-tube component 14 and the connection component 2a.

A perspective view of a second variant of the connection component 2b is illustrated in FIG. 4. A knurling 4 is applied so as to be radially on the outside on this connection component 2b, this knurling 4 forming the form-fitting region. The connection component 2b is specified so as to be press-fitted into the second variant of the receptacle-tube component illustrated in FIG. 5, so as to configure the friction-fitting/form-fitting shaft-to-hub connection. The cylindrical face 5 which forms the further form-fitting region is disposed in the receptacle tube component 3b. The form-fitting region (knurling 4) is replicated in the further form-fitting region (cylindrical face 5) when the connection component 2b is press-fitted into the receptacle-tube component 3b, and the form-fitting region and the further form-fitting region thus form the friction-fitting/form-fitting shaft-to-hub connection.

A support ring 11 which counteracts deformation of the receptacle-tube component in a radially outward manner (direction 9) when the connection component 2b is press-fitted into the receptacle-tube component 3b of this variant of the motor vehicle drive shaft is provided. The support ring 11 in the longitudinal direction 8 is disposed in the region of the friction-fitting/form-fitting shaft-to-hub connection. The assembled motor vehicle drive shaft is illustrated in a partial section in FIG. 6. The push-fit component 1b of this variant is connected in a materially integral manner to the connection component. The motor vehicle drive shaft in the torque-transmitting state thereof is rotatable about the rotation axis. In the crash state, the friction-fitting/form-fitting shaft-to-hub connection is cancelled under axial loading in the longitudinal direction 8, and the push-fit component 1b is displaced into the receptacle-tube component.

LIST OF REFERENCE SIGNS

1a Push-fit component (first variant)
1b Push-fit component (second variant)
2a Connection component (first variant)
2b Connection component (second variant)
3a Receptacle-tube component (first variant)
3b Receptacle-tube component (second variant)
4 Knurling (form-fit region)
5 Cylindrical face (further form-fit region)
6 Welded connection
7 Rotation axis
8 Longitudinal direction
9 Radial direction
10 Friction-fitting/form-fitting shaft-to-hub connection
11 Support ring
12 Receptacle internal diameter
13 Push-fit external diameter
14 Receptacle connection
15 Push-fit connection

What is claimed is:

1. A motor vehicle drive shaft, comprising:
a receptacle-tube component with a receptacle internal diameter;
a push-fit component with a push-fit external diameter; and
a connection component, wherein
the push-fit external diameter is smaller than or equal to the receptacle internal diameter,
the receptacle-tube component and the push-fit component are rotatable about a common drive shaft rotation axis and extend along the common drive shaft rotation axis in a longitudinal direction,
the connection component, by way of a receptacle connection, is connected in a torque-conducting manner to the receptacle-tube component,
the connection component, by way of a push-fit connection, is welded to the push-fit component, wherein at least one end of the connection component is inserted into an interior of the push-fit component such that the push-fit component is arranged radially outside of the at least one end of the connection component,
the receptacle connection between the connection component and the receptacle-tube component is configured as a combined friction-fitting/form-fitting shaft-to-hub connection,
the connection component has a knurling,
the receptacle-tube component has a receptacle connection region which, together with the knurling, forms the friction-fitting/form-fitting shaft-to-hub connection to the connection component at the region of the knurling of the connection component, and
the receptacle-tube component and the push-fit component are connected to one another via the connection component for transmitting torque.

2. The motor vehicle drive shaft according to claim 1, wherein
the friction-fitting/form-fitting shaft-to-hub connection is configured as a knurled press-fit connection.

3. The motor vehicle drive shaft according to claim 1, wherein
the connection component, in the region of the knurling, has a connection receptacle hardness on a surface of the connection component;
the receptacle-tube component in the receptacle connection region has a receptacle hardness on a surface of the receptacle-tube component; and
the connection receptacle hardness of the connection component is greater than the receptacle hardness of the receptacle-tube component.

4. The motor vehicle drive shaft according to claim 1, further comprising:
a support ring arranged radially outside on the receptacle-tube component, wherein
the support ring in the longitudinal direction at least in portions covers the friction-fitting/form-fitting shaft-to-hub connection.

5. The motor vehicle drive shaft according to claim 4, wherein
the receptacle-tube component in the receptacle connection region has a receptacle external diameter which is smaller than the receptacle internal diameter in another region separated from the receptacle connection region in the longitudinal direction of the receptacle-tube component.

6. The motor vehicle drive shaft according to claim 1, wherein
the receptacle-tube component in the receptacle connection region has a receptacle external diameter which is smaller than the receptacle internal diameter in another region separated from the receptacle connection region in the longitudinal direction of the receptacle-tube component.

7. A method for producing a motor vehicle drive shaft, the method comprising:
providing a push-fit component, a receptacle-tube component, and a connection component, wherein an external diameter of the push-fit component is smaller than or equal to an internal diameter of the receptacle component;
providing the connection component with a knurling;
press-fitting the connection component provided with the knurling into the receptacle-tube component so as to configure a friction-fitting/form-fitting shaft-to-hub connection between the connection component and the receptacle-tube component;
inserting at least one end of the connection component into an interior of the push-fit component such that the push-fit component arranged radially outside of the at least one end of the connection component; and
welding the push-fit component to the connection component, wherein
the receptacle-tube component and the push-fit component are rotatable about a common drive shaft rotation axis and extend along the common drive shaft rotation axis in a longitudinal direction, and
the receptacle-tube component and the push-fit component are connected to one another via the connection component for transmitting torque.

8. The method according to claim 7, further comprising:
applying a support ring to the receptacle-tube component prior to the connection component being press-fitted into the receptacle-tube component.

9. A motor vehicle drive shaft, comprising:
a receptacle-tube component with a receptacle internal diameter;
a push-fit component with a push-fit external diameter; and
a connection component, wherein
the push-fit external diameter is smaller than or equal to the receptacle internal diameter,
the receptacle-tube component and the push-fit component are rotatable about a common drive shaft rotation axis and extend along the common drive shaft rotation axis in a longitudinal direction,
the connection component, by way of a receptacle connection, is connected in a torque-conducting manner to the receptacle-tube component,
the connection component, by way of a push-fit connection, is connected to the push-fit component,
the push-fit connection between the connection component and the push-fit component is configured as a combined friction-fitting/form-fitting shaft-to-hub connection, wherein at least one of the push-fit component or the connection component has a knurling in a region of the push-fit connection to form the combined friction-fitting/form-fitting shaft-to-hub connection,
wherein one end of the push-fit component is inserted into an interior of a first end of the connection component at least in the region of the push-fit connection,
the receptacle-tube component and the connection component are welded together to form the receptacle connection, wherein one end of the receptacle-tube component is inserted into an interior of a second end of the connection component, and
the receptacle-tube component and the push-fit component are connected to one another via the connection component for transmitting torque.

10. The motor vehicle drive shaft according to claim 9, wherein
the push-fit component has a knurling,
the push-fit component in a region of the knurling has a push-fit hardness on a surface of the push-fit component;
the connection component has a connection region which is adapted for configuring the friction-fitting/form-fitting shaft-to-hub connection to the push-fit component;
the connection component in the connection region has a connection push-fit hardness on a surface of the connection component; and
the push-fit hardness of the push-fit component is greater than the connection push-fit hardness of the connection component.

* * * * *